United States Patent [19]

Manrique et al.

[11] Patent Number: 5,058,456
[45] Date of Patent: Oct. 22, 1991

[54] SPEED REDUCER

[76] Inventors: Francisco F. Manrique; Helenio F. Manrique, both of Polig. Ind. Fuente del Jarro Villa de Bilbao, 66, 46980 Paterna, Spain

[21] Appl. No.: 616,830
[22] Filed: Nov. 16, 1990

Related U.S. Application Data

[63] Continuation of Ser. No. 324,201, Mar. 15, 1989, abandoned.

[30] Foreign Application Priority Data

Mar. 6, 1989 [ES] Spain .................................. 8900801

[51] Int. Cl.⁵ ............................................. F16H 57/02
[52] U.S. Cl. ................................................. 74/606 R
[58] Field of Search ............................... 74/606 R–607

[56] References Cited

U.S. PATENT DOCUMENTS

| 2,734,393 | 2/1956 | Luenberger ................. 74/606 R X |
| 2,956,451 | 10/1960 | Bowman ............................ 74/606 R |
| 3,154,963 | 11/1964 | Caley et al. ....................... 74/606 R |
| 3,222,954 | 12/1965 | Wuertz ............................... 74/606 R |
| 4,020,715 | 5/1977 | Sollars ................................ 74/606 R |
| 4,333,358 | 6/1982 | Grattapaglia ................. 74/606 R X |
| 4,344,501 | 8/1982 | Jerry et al. ........................ 74/606 R |
| 4,594,911 | 6/1986 | Hoffmann .......................... 74/606 R |
| 4,786,180 | 11/1988 | Chszaniecki et al. ........ 74/606 R X |

FOREIGN PATENT DOCUMENTS

| 818716 | 9/1951 | Fed. Rep. of Germany .... 74/606 R |
| 1032635 | 6/1958 | Fed. Rep. of Germany .... 74/606 R |
| 501432 | 11/1954 | Italy .................................. 74/606 R |

Primary Examiner—Vinh T. Luong
Attorney, Agent, or Firm—Zarley, McKee, Thomte, Voorhees & Sease

[57] ABSTRACT

A speed reducer comprised of a casing (1) obtained in a single block, which comprises a broad opening (2) through which it is possible to mount the different internal elements, among which there is a flange (4) which permits the assembly of a bottom shaft (7) with its pinion (8) and meshing (9), resting at one end of the bearings (10) and at the other on a bridge (11). It also includes some coaxial shafts (12, 13) resting on the flange (4) and on bearings (14, 15). The shaft (12) is the one that is coupled to the motor outlet (16), while the shaft (13) protrudes through the opposite part and constitutes the structure for effecting the transmission. The special distribution of the described internal elements permits that none of the gearing is overhanging; in other words, all the shafts have two supports with bearing, determining a greater balance and greater resistance of the unit.

2 Claims, 8 Drawing Sheets

SPEED REDUCER

This is a continuation of copending application Ser. No. 07/324,201 filed on Mar. 15, 1989 now abandoned.

BACKGROUND OF THE INVENTION

1. Field of the Invention

The object of the invention refers to a speed reducer, whose features permit transmission for operation of all types of mechanisms which require a slow operating speed and replaces all conventional elements, with the advantage of taking up very little space and the obtainment of better efficiency.

2. Description of the Prior Art

In general terms, a speed reducer has the task of transmission thanks so that the tree or main shaft of a machine can rotate with a speed lower than the one of the motor tree which moves it.

Known reducers go from transmission by belts, in which the pulled pulley has a larger diameter than the drive pulley, up to transmission by chain or by gearings.

In other cases, important reductions are obtained by the use of worm screws or more or less complicated sets of gearing such as the epicyclic train.

In any of the known cases, the construction of the reducer has noteworthy complications of the support elements of the gearing, as well as the bothersome noise that they make and in the scarce efficiency which is obtained.

The lateral stresses to which the shafts of the gearing are subjected determines the production of play and deformations which are the ones which wear the shafts and gearing producing vibrations and breakage.

SUMMARY OF THE INVENTION

To solve the described problems, the invention proposes the speed reducer which is described, which has the advantages of being a compact unit with cylindric gearing and coaxial and parallel shafts occupying very little space with a higher efficiency.

To this effect, the reducer comprises a monoblock casing which inside has a special distribution by which it is obtained that none of the gearings, pinions, as well as wheels, are overhanging. For this reasons, all its shafts are located between two supports with bearings with a more balanced construction and greater resistance of the reducer unit.

The casing is obtained in a single block which comprises a front mouth dimensioned to this effect so that through it the different component parts can be assembled, among which stands out a fastening flange with a disk shape provided with a center boring for the shafts of two coaxial gearing and peripheral borings for the anchoring thereof in a seat foreseen inside the casing. This flange has a gap through which the bottom gearing of the reducer can be assembled.

Also inside the casing there is a horizontal support for a bearing which permits the assembly of the bottom parallel shaft.

The reducer unit is conceived for great versatility by means of coupling the corresponding covers in the entrance of the shaft of the power supply of the motor as well as in the reducer outlet.

The reducer offers various possibilities:
1. Two reduction stages.
2. Three reductions stages.

In the first case as well as in the second, different variations are obtained:

a) Including the motor and clamp dogs.

b) With shaft for power supply of a drive shaft and clamp dogs.

c) With anchoring flange in the casing in the power output surface including a motor (according to paragraph a) without dogs.

d) With anchoring flange with shaft outlet for power supply (according to paragraph b) without dogs.

For this purpose a series of accessories, which in the case of two states of reduction consisting of the following, have been foreseen:

1. Including a cover for direct coupling between the casing and the motor frame.

2. Including an anchoring flange in the shaft of power outlet for the incorporation in the wall.

For the case of three-stage reduction:

1. Cover of direct coupling which permits the clamping between the casing and the motor frame, foreseeing in this cover the support for the shaft in axial prolongation and for the fourth reducer shaft corresponding to the power inlet.

2. Including an anchoring flange in the shaft of power outlet for its coupling to the wall.

The arrangement of a three-stage reducer with a flange and without a motor is also foreseen.

In the case of a motor reducer or reducer with flange, two-stage as well as three-stage ones, the variation of the casing results are minimal, as far as its outside shape is concerned, and it maintains its internal features with the arrangement of the flange and support for the shafts.

This arrangement of elements makes it possible to have the shaft of power supply and the outlet shaft in axial prolongation, while the third shaft remains parallel to these two, and the fourth one is mounted with the addition of a replacement cover.

DETAILED DESCRIPTION OF THE PREFERRED EMBODIMENT

For a better understanding of the object of the invention, a set of drawings which represents the speed reducer in different positions and construction and assembly details accompany the present specification.

Figure 1:
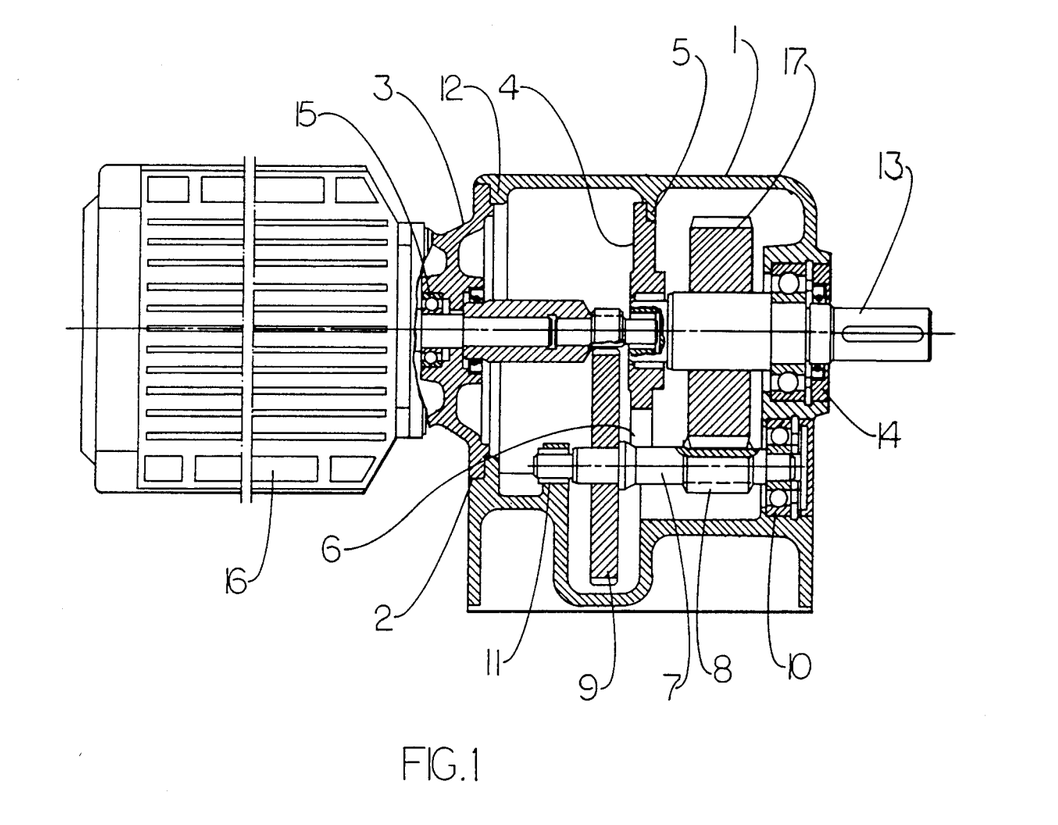
FIG. 1 is a partial side vertical sectional view of a preferred embodiment of the invention.

A motor reducer with two stages seen in vertical section is seen in FIG. 1. The casing 1 corresponds to a reducer with dogs 2 for support on the floor. It is obtained in a single piece and has a big opening 2, which in the represented case is covered by a cover 3, through which all of the internal elements can be assembled, such as the flange 4 formed by a circular plate with seat on protrusions 5 foreseen in the inside of the casing, whose flange has a gap 6 which permits the assembly of the bottom shaft 7 with its pinion 8 and meshing 9, which at one end rests on the bearings 10 of the casing and on the other end on the bridge 11. The coaxial shafts 12 and 13 are supported together on the plate 4 by one of the ends thereof and by the other end on the bearings 14 and 15 arranged in the casing 1 and on the cover 3 which covers the opening of the casing, where the motor is coupled by clamping. The gearings 9 and 17 mounted on the shafts are cylindric. The coaxial shaft 13 protrudes from the casing to effect the transmission.

For purposes of this application, shaft 12 is the driven shaft, shaft 7 is the driven shaft as is shaft 13. Shafts 12 and 7 are interconnected by reduction gear or meshing 9, and shafts 7 and 13 are interconnected by meshing or reduction gear 17.

FIGS. 2A–2D represent the cover in a front and sectional view. All around it there is a wing 18 with equidistant borings for clamping thereof to the casing. On the other side there are also flanges for connection to the motor.

This cover is replaced in the different versions of the reducer, as has been explained in the description of the invention.

Figures 2A, 2B:
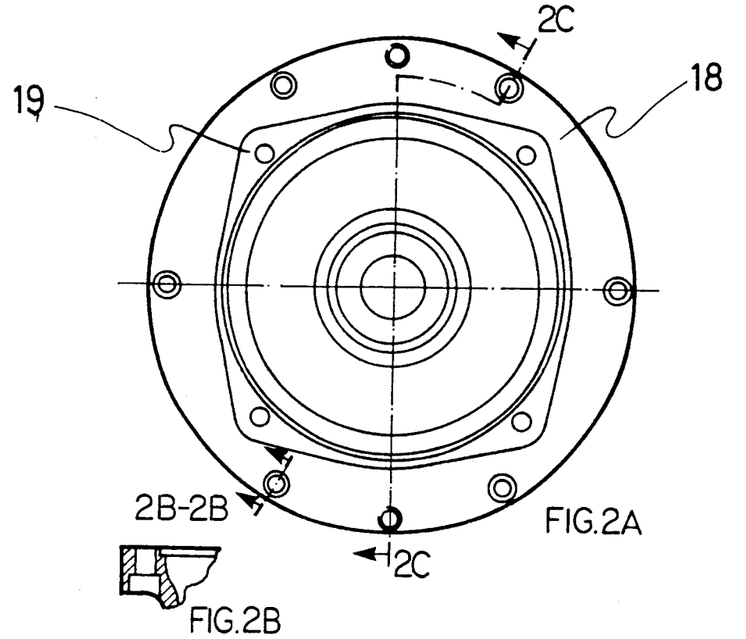
FIG. 2A is an end elevational view of the embodiment of FIG. 1.
FIG. 2B is an isolated partial sectional view taken along line 2B—2B of FIG. 2A.
Figure 2C:
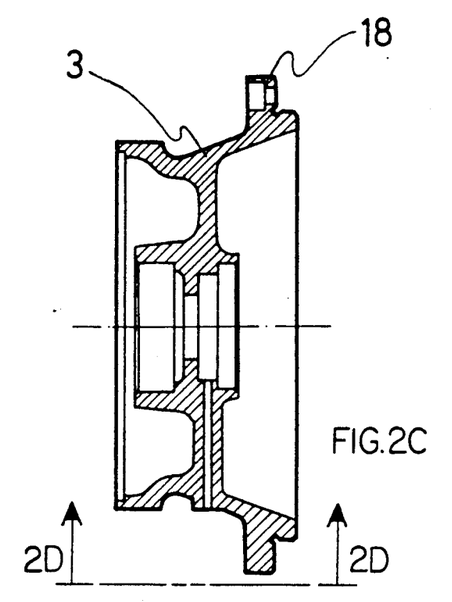
FIG. 2C is a sectional view taken along line 2C—2C of FIG. 2A.
Figure 2D:
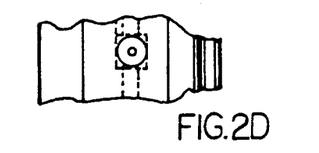
FIG. 2D is a partial bottom view taken along line 2D—2D of FIG. 2C.
Figure 3:
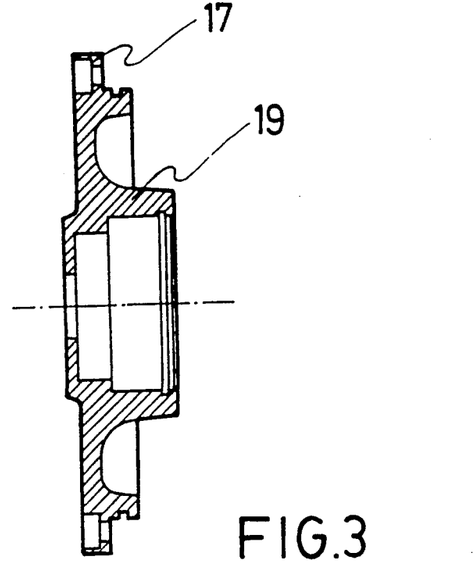
FIG. 3 is an isolated sectional view of an alternative embodiment of what is shown in FIG. 2C.

FIG. 3 represents the section of a cover 20 which like 3 represented in FIG. 2, has its wing with equidistant borings for clamping thereof to the casing. In this case the front connection end to the motor has been deleted, as the reducer has to be incorporated at the midpoint between a drive shaft and another driven shaft. This cover is for a two-stage reduction reducer.

Figure 4A:
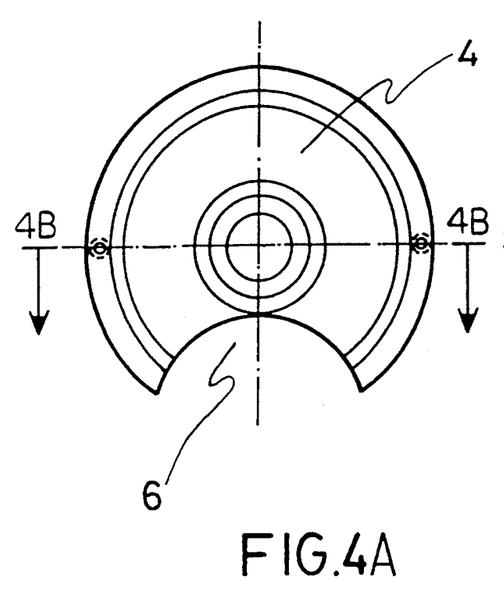
FIG. 4A is an isolated front elevational and sectional view of flange 4 of FIG. 1.
Figure 4B:
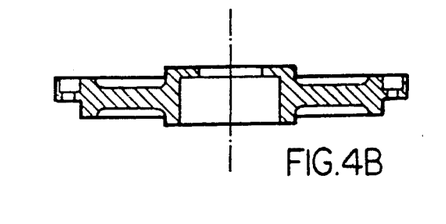
FIG. 4B is a sectional view taken along line 4B—4B of FIG. 4A.

FIGS. 4A–4B represent a front raised and sectional view of the plate or flange 4. In the front view one can see the gap 6 which permits the assembly of the bottom shaft.

Figure 5A:
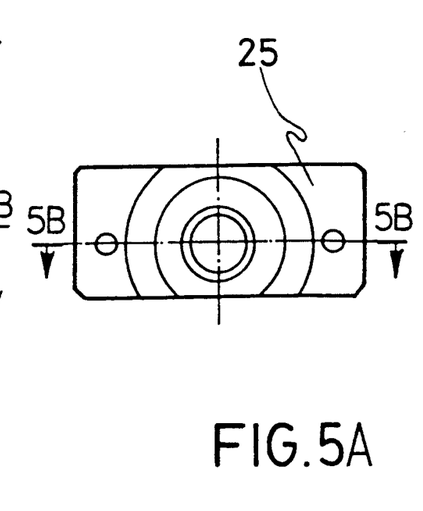
FIG. 5A is a front elevational and sectional view of bridge 25 of FIG. 6.
Figure 5B:
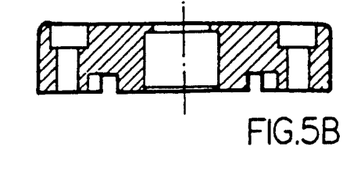
FIG. 5B is a sectional view taken along line 5B—5B of FIG. 5A.
Figure 6:
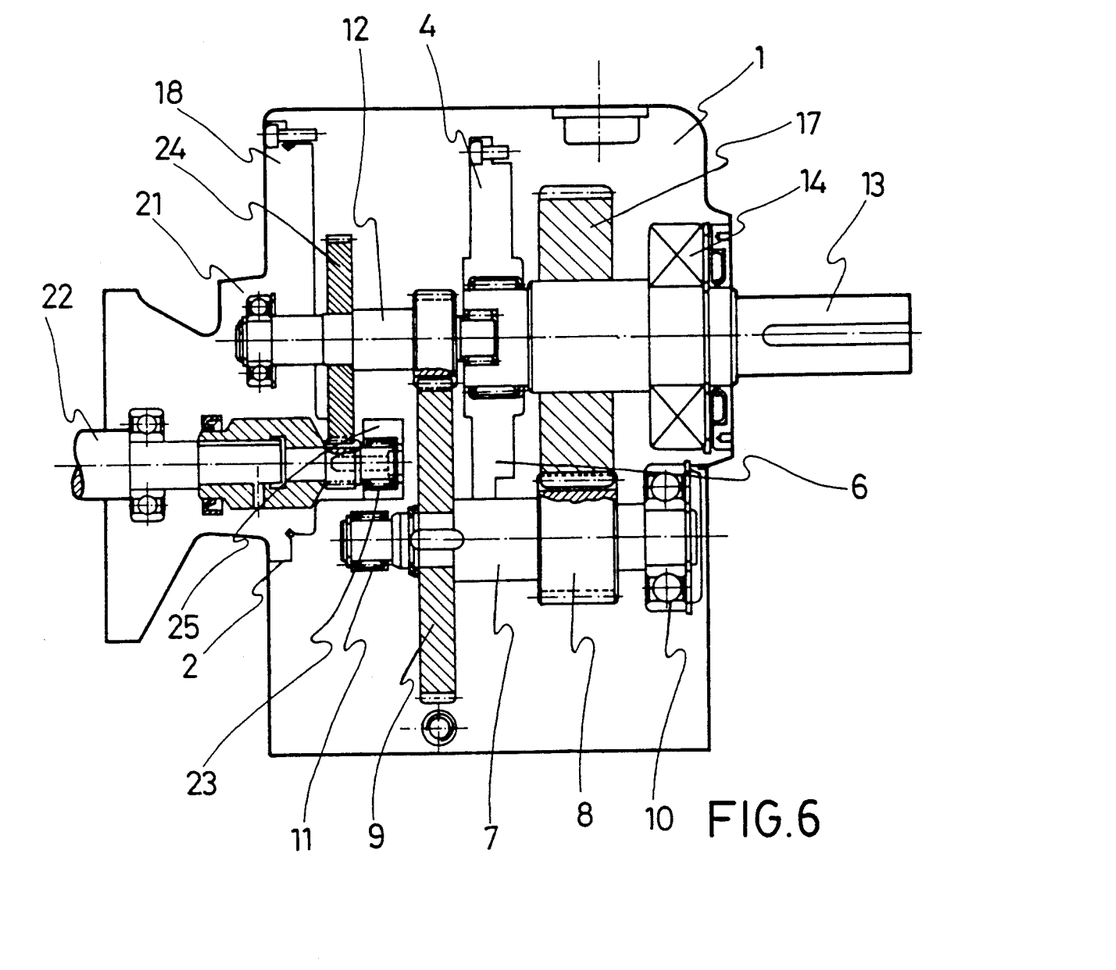
FIG. 6 is a side elevational and sectional view of an alternative embodiment of the present invention.

FIGS. 5A–5B show a front raised and sectional view of the bridge 25 for support of the bottom shaft of the three-stage reducer (See FIG. 6).

FIG. 6 represents a diagram of a three-stage reduction motor reducer, with dogs. The only variation with regard to FIG. 1 is the cover 21, (FIG. 9) which permits the arrangement of a fourth parallel shaft 22, with pinion 23, through which it is meshed with the wheel 24 mounted on the shaft 12, (FIG. 1). The nose of coupling to the motor maintains the same features as in the case of the cover of FIG. 2, and likewise the flange 18 for anchoring to the casing 1. In this case, the nose remains eccentric to the flange 18 to permit the arrangement of the cited fourth shaft 22 with another internal support 25.

Figure 7:
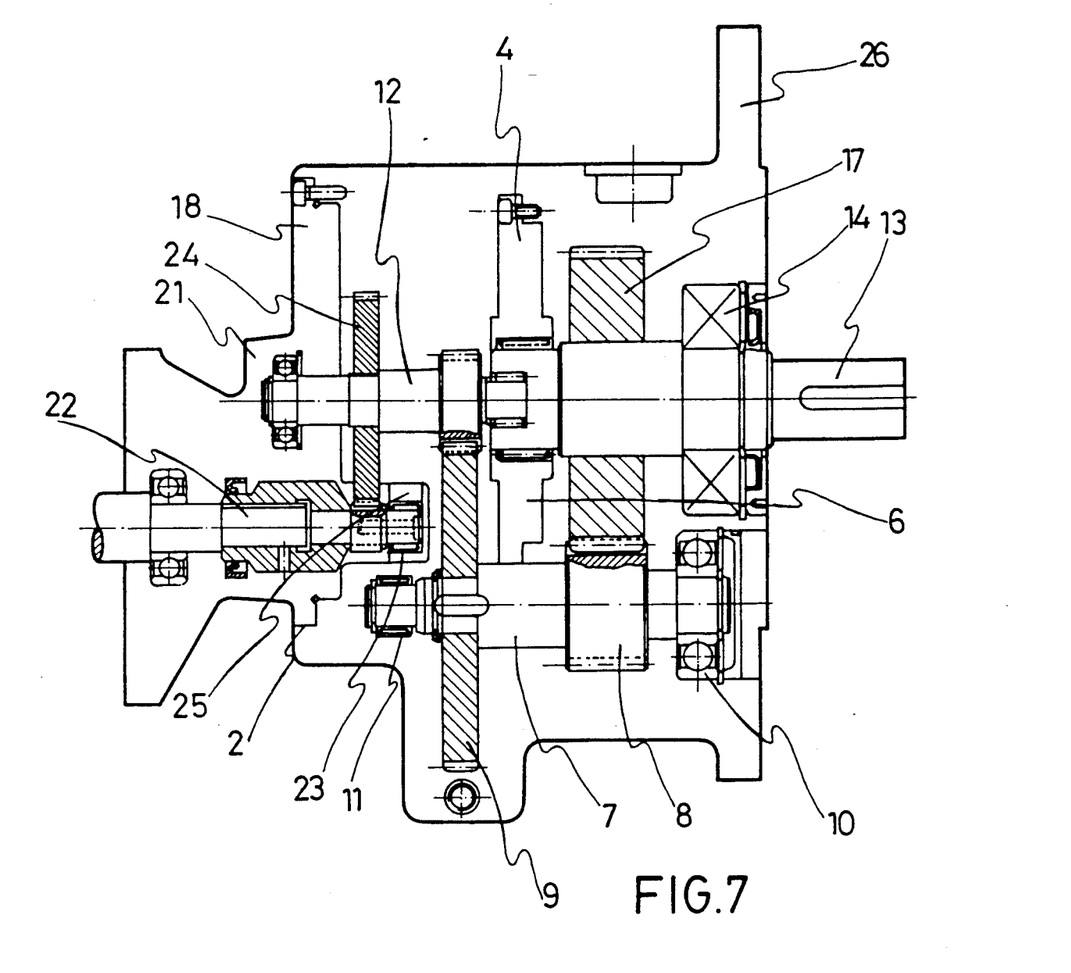
FIG. 7 is a side elevational and sectional view of another alternative embodiment for the present invention.
Figure 8A:
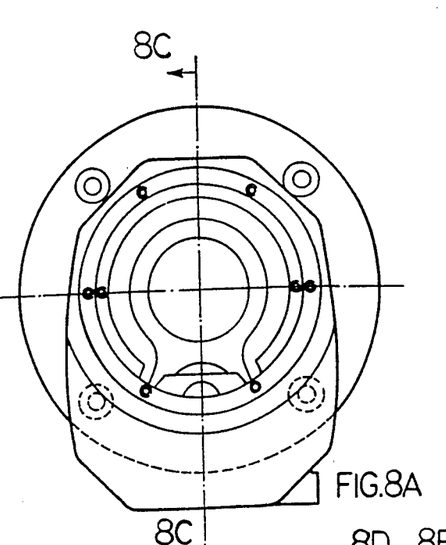
FIG. 8A is a left end elevational view of FIG. 7.
Figure 8B:
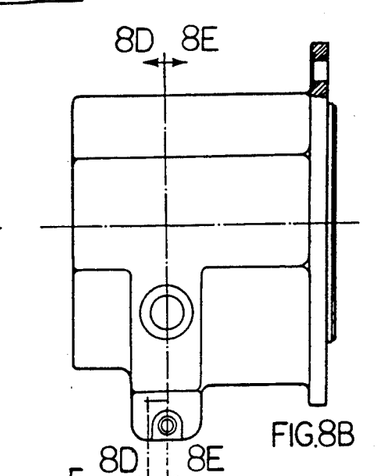
FIG. 8B is a side elevational view of FIG. 8A.
Figure 8C:
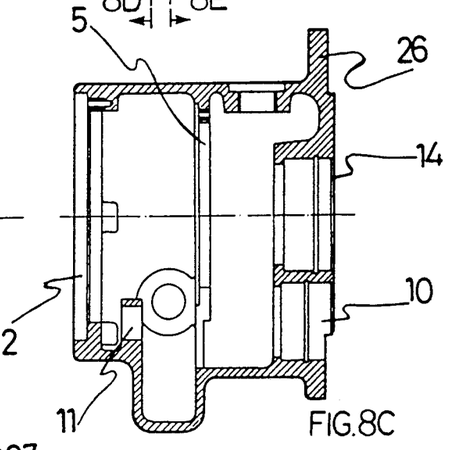
FIG. 8C is a sectional view taken along line 8C—8C of FIG. 8A.
Figure 8D:
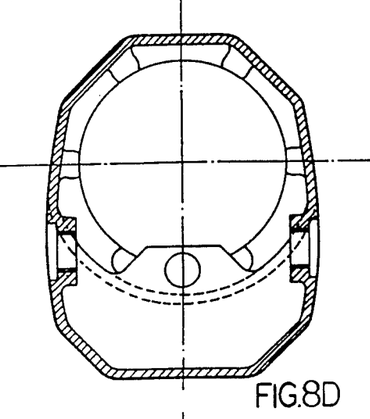
FIG. 8D is a sectional view taken along line 8D—8D of FIG. 8B.
Figure 8E:
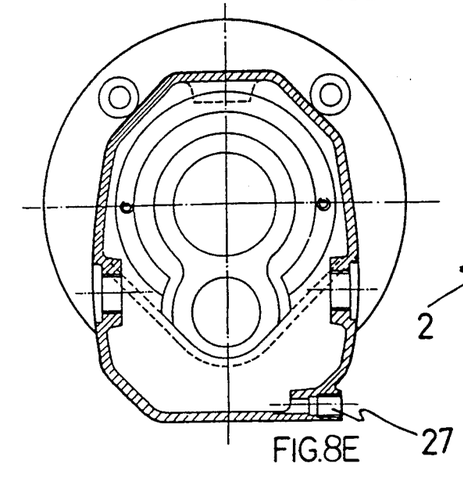
FIG. 8E is a sectional view taken along line 8E—8E of FIG. 8C.
Figures 9A, 9B:
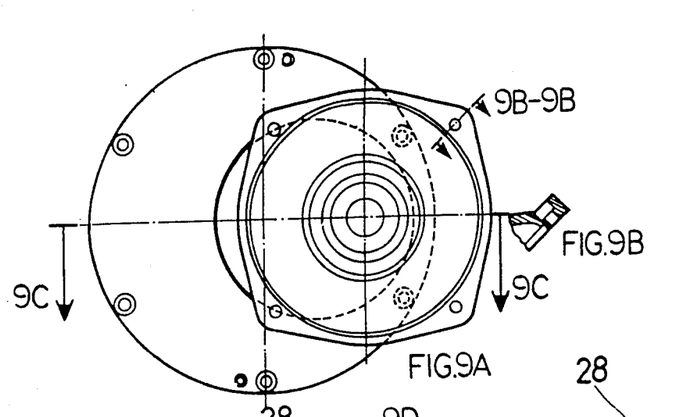
FIG. 9A is an end elevational view of a speed reducer cover which can be used for a three-stage embodiment shown in FIGS. 6 or 7.
FIG. 9B is a partial sectional view taken along line 9B—9B of FIG. 9A.
Figure 9C:
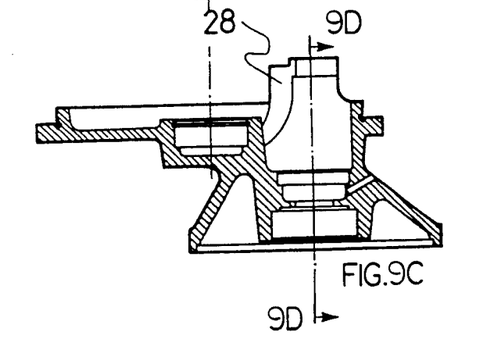
FIG. 9C is a sectional view taken along line 9C—9C of FIG. 9A.
Figure 9D:
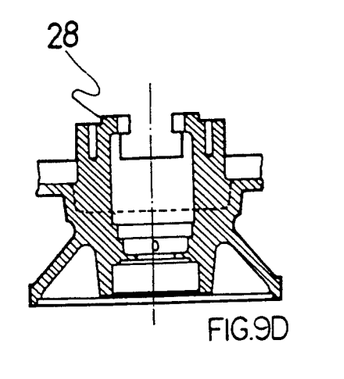
FIG. 9D is a sectional view taken along line 9D—9D of FIG. 9C.
Figure 9E:
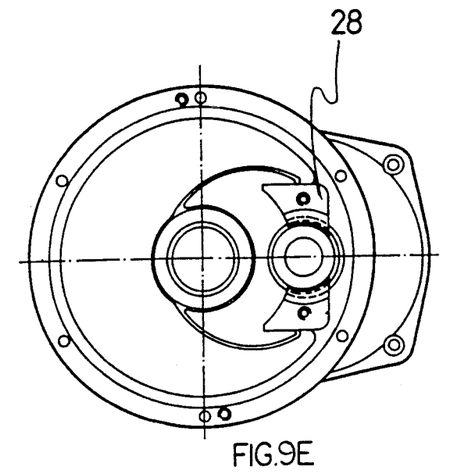
FIG. 9E is a rear elevational view of FIG. 9A.
Figure 9F:
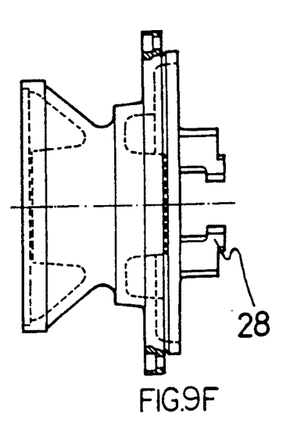
FIG. 9F is a side elevational view of FIG. 9E.
Figure 10A:
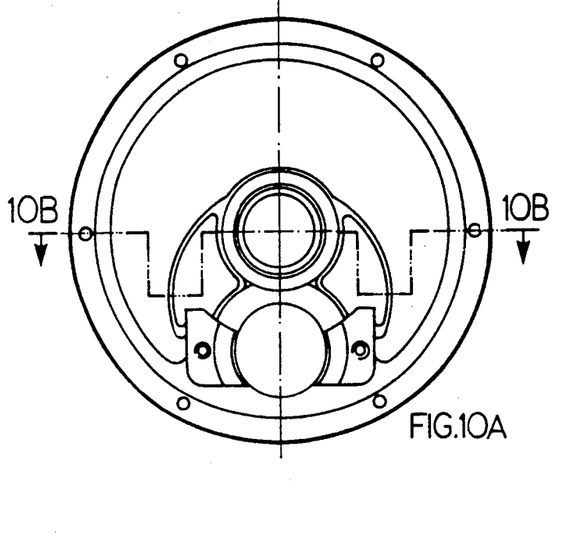
FIG. 10A is an end elevational view of an alternative embodiment for a cover for a three-stage reducer for the invention.
Figure 10B:
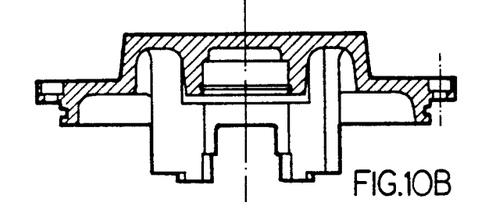
FIG. 10B is a sectional view taken along line 10B—10B of FIG. 10A.
Figure 10C:
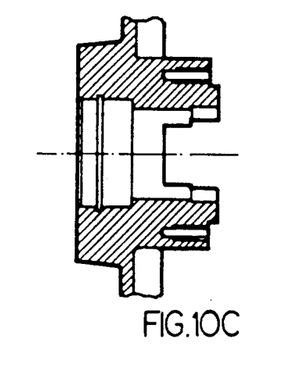
FIG. 10C is a sectional view taken along line 10C—10C of FIG. 10E.
Figure 10D:
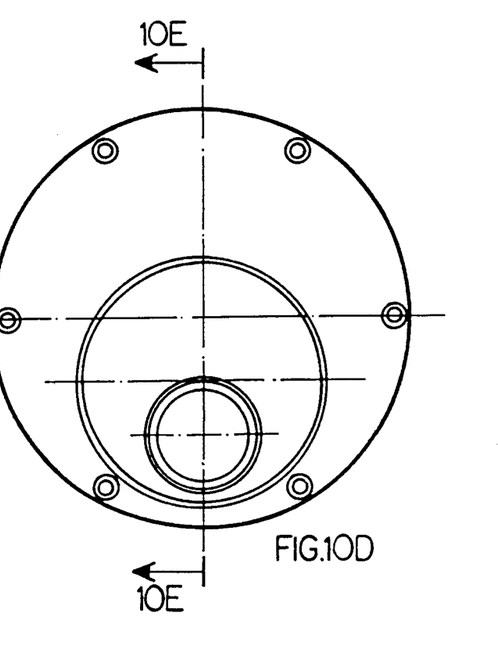
FIG. 10D is a rear elevational view of FIG. 10A.
Figure 10E:
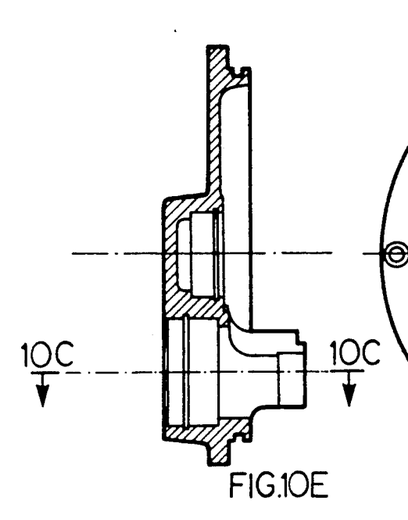
FIG. 10E is a sectional view taken along line 10E—10E of FIG. 10D.

FIG. 7 represents the diagram of a three-stage reduction motor reducer, whose features are identical to the one represented in FIG. 6, except in the exterior flange 26 of the casing in the surface opposite the motor position, in other words, of the driven shaft outlet 13 for anchoring the reducer to the wall.

FIGS. 8A–8E show the casing just as it corresponds to the one of FIG. 7, where one can clearly see all the internal protrusions (FIG. 1) and the access mouth 2 to the inside which permits assembly of the different elements and the location of the different covers depending on the type of reducer. As can be seen, it is obtained in a single piece. The housings 10, 11, and 14 for the bearings of the shafts and the protrusion 5 for the cover-flange for support of the coaxial shafts are visible therein. The hole 27 for purging the lubricating oil can also be seen in this figure.

FIGS. 9A–9E correspond to different views and sections in physical representation of the cover of a motor reducer with three stages of reduction to which the motor is coupled, as shown in the diagrams of FIGS. 6 and 7. The support 25 (FIG. 5) is coupled to the rear end 28.

FIGS. 10A–10E correspond to different views and sections in physical representation of the cover of the three-stage reducer through which the shaft primary receiver of the power supply in which the nose of coupling to the motor has been suppressed. This cover is mounted on the three-stage reducers which have to be incorporated at the midpoint between the drive shaft and other driven shaft. In the inside part, it has the end 28 like the cover of FIG. 9.

From what has been described, it is understood that from a single monoblock casing a two- to three-stage reduction reducer is obtained with a multitude of industrial uses due to the versatility given to it by the different elements which can be coupled to the outside, as well as to the inside, which permits the coupling thereof between a drive shaft and another driven shaft or directly to the motor.

We claim:

1. A speed reducer comprising,
    a casing cast in a single piece and having a front surface and an inside, a plurality of protrusion elements on said casing and extending inwardly into said inside of said casing, a plurality of shaft support flanges secured to said protrusion elements, a plurality of shafts inside said casing with each shaft having opposite ends rotatably mounted on said shaft support flanges, at least two of said shafts being coaxially aligned within said inside of said casing, and having adjacent ends rotatably supported on the same one of said shaft support flanges, a plurality of reduction gears mounted on said shafts, said front surface of said casing having an opening of sufficient size to permit installation and assembly of said gears through said opening and inside said casing, a cover on said opening, and a bearing means on said cover for supporting one end of one of said shaft.

2. The speed reducer according to claim 1 wherein said shafts are parallel and include a drive shaft, and first and second driven shafts for the transmission of power, one of said reduction gears connecting said drive shaft to said first driven shaft, another of said reduction gears connecting said first driven shaft to said second driven shaft.

* * * * *